US011536923B2

(12) United States Patent
Wang et al.

(10) Patent No.: US 11,536,923 B2
(45) Date of Patent: Dec. 27, 2022

(54) OPTICAL ELEMENT DRIVING MECHANISM

(71) Applicant: TDK TAIWAN CORP., Taoyuan (TW)

(72) Inventors: Chao-Hsi Wang, Taoyuan (TW); Chao-Chang Hu, Taoyuan (TW); Chih-Wei Weng, Taoyuan (TW); Kuen-Wang Tsai, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 338 days.

(21) Appl. No.: 16/844,120

(22) Filed: Apr. 9, 2020

(65) Prior Publication Data
US 2020/0393667 A1      Dec. 17, 2020

Related U.S. Application Data

(60) Provisional application No. 62/861,440, filed on Jun. 14, 2019.

(30) Foreign Application Priority Data

Feb. 3, 2020   (CN) .......................... 202020150617.2

(51) Int. Cl.
| | |
|---|---|
| G02B 7/00 | (2021.01) |
| H04N 5/232 | (2006.01) |
| G03B 5/04 | (2021.01) |
| G02B 7/04 | (2021.01) |

(Continued)

(52) U.S. Cl.
CPC ............. *G02B 7/005* (2013.01); *G02B 7/026* (2013.01); *G02B 7/04* (2013.01); *G02B 7/08* (2013.01); *G02B 7/09* (2013.01); *G02B 26/02* (2013.01); *G02B 27/646* (2013.01); *G03B 3/10* (2013.01); *G03B 5/02* (2013.01); *G03B 5/04* (2013.01); *G03B 13/36* (2013.01); *H02K 11/21* (2016.01); *H02N 2/043* (2013.01); *H04N 5/2252* (2013.01);

(Continued)

(58) Field of Classification Search
CPC ........ G02B 27/646; G02B 7/005; G02B 7/04; G02B 7/09; G02B 26/02; G02B 26/023; G02B 26/04; G03B 5/04; G03B 13/36; G03B 2205/0053; G03B 2205/0069; H02K 11/21; H04N 5/2252; H04N 5/2254; H04N 5/2257; H04N 5/232
USPC ....................................................... 359/227
See application file for complete search history.

(56) References Cited

U.S. PATENT DOCUMENTS

| | | | |
|---|---|---|---|
| 8,118,503 B2* | 2/2012 | Kihara | H04N 5/2254 396/483 |
| 2004/0258405 A1* | 12/2004 | Shiratori | H04N 5/2254 396/458 |

(Continued)

*Primary Examiner* — William R Alexander
(74) *Attorney, Agent, or Firm* — Muncy, Geissler, Olds & Lowe, P.C.

(57) ABSTRACT

An optical element driving mechanism is provided. The optical element driving mechanism includes a fixed portion, a movable portion, and a driving assembly. The fixed portion includes a limiting portion. The movable portion is movably disposed on the fixed portion and includes an optical element and a connecting assembly. The optical element has a main axis. The connecting assembly is connected to the optical element. The driving assembly is at least partially disposed on the fixed portion, wherein the limiting portion is used for limiting the range of motion of the movable portion relative to the fixed portion.

20 Claims, 11 Drawing Sheets

(51) Int. Cl.
*G02B 27/64* (2006.01)
*H02K 11/21* (2016.01)
*G02B 7/09* (2021.01)
*H04N 5/225* (2006.01)
*G02B 26/02* (2006.01)
*G02B 7/02* (2021.01)
*G02B 7/08* (2021.01)
*G03B 3/10* (2021.01)
*G03B 5/02* (2021.01)
*H02N 2/04* (2006.01)
*G03B 13/36* (2021.01)

(52) U.S. Cl.
CPC ......... *H04N 5/2254* (2013.01); *H04N 5/2257* (2013.01); *H04N 5/232* (2013.01); *G03B 2205/0015* (2013.01); *G03B 2205/0053* (2013.01); *G03B 2205/0061* (2013.01); *G03B 2205/0069* (2013.01)

(56) References Cited

U.S. PATENT DOCUMENTS

| | | | |
|---|---|---|---|
| 2005/0286889 A1* | 12/2005 | Kihara | G03B 9/10 396/463 |
| 2006/0024050 A1* | 2/2006 | Kudo | G03B 9/00 396/458 |
| 2007/0201866 A1* | 8/2007 | Kihara | G03B 9/18 396/468 |
| 2010/0202770 A1* | 8/2010 | Kihara | H04N 5/2254 396/493 |

\* cited by examiner

OPTICAL ELEMENT DRIVING MECHANISM

CROSS REFERENCE TO RELATED APPLICATIONS

This application claims the benefit of U.S. Provisional Application No. 62/861,440, filed on Jun. 14, 2019, and China Patent Applications No. 202020150617.2, filed on Feb. 3, 2020, which are incorporated by reference herein in their entirety.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

BRIEF SUMMARY OF DISCLOSURE

An optical element driving mechanism is provided. The optical element driving mechanism includes a fixed portion, a movable portion, and a driving assembly. The fixed portion includes a limiting portion. The movable portion is movably disposed on the fixed portion and includes an optical element and a connecting assembly. The optical element has a main axis. The connecting assembly is connected to the optical element. The driving assembly is at least partially disposed on the fixed portion, wherein the limiting portion is used for limiting the range of motion of the movable portion relative to the fixed portion.

In some embodiments, the connecting assembly further includes a rotation element, a first connecting element, and a second connecting element. The rotation element is rotating around a rotational axis. The rotation element and the second connecting element are connected to the first connecting element. In some embodiments, the rotational axis does not pass through the point where the rotation element is connected to the first connecting element. In some embodiments, the second connecting element at least partially overlaps the rotation element along the main axis during an open condition. In some embodiments, the rotational axis does not pass through the second connecting element during the open condition.

In some embodiments, the main axis and the rotational axis do not intersect. In some embodiments, the optical element driving mechanism further includes a circuit at least partially embedded in the fixed portion. In some embodiments, the circuit is exposed from the side of the fixed portion that faces the optical element. In some embodiments, the driving assembly includes a magnetic element and a magnetic permeable element. The magnetic permeable element is disposed in the magnetic element, wherein the main axis does not pass through the magnetic permeable element. In some embodiments, a gap is formed between the magnetic element and the fixed portion in a first direction that is perpendicular to the main axis. In some embodiments, the magnetic permeable element extends in the first direction.

In some embodiments, the fixed portion includes a base, a case, and an extending element. The case is disposed on the base. The extending element is disposed on the base, wherein the extending element has an opening, and the main axis passes through the opening. In some embodiments, the extending element is exposed from the case when viewed in a second direction that is perpendicular to the main axis. In some embodiments, the base has a recess on the side facing away from the case. In some embodiments, the size of the opening is less than the size of the driving assembly. In some embodiments, the size of the optical element is greater than the size of the opening in a second direction that is perpendicular to the main axis.

In some embodiments, the mode of motion of the optical element is different than the mode of motion of the connecting assembly. In some embodiments, the optical element driving mechanism further includes an optical module, wherein the optical module and the driving assembly are arranged in a first direction that is perpendicular to the main axis. In some embodiments, the optical module has a rectangular shape. In some embodiments, the optical module and the fixed portion at least partially overlap each other in the first direction.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
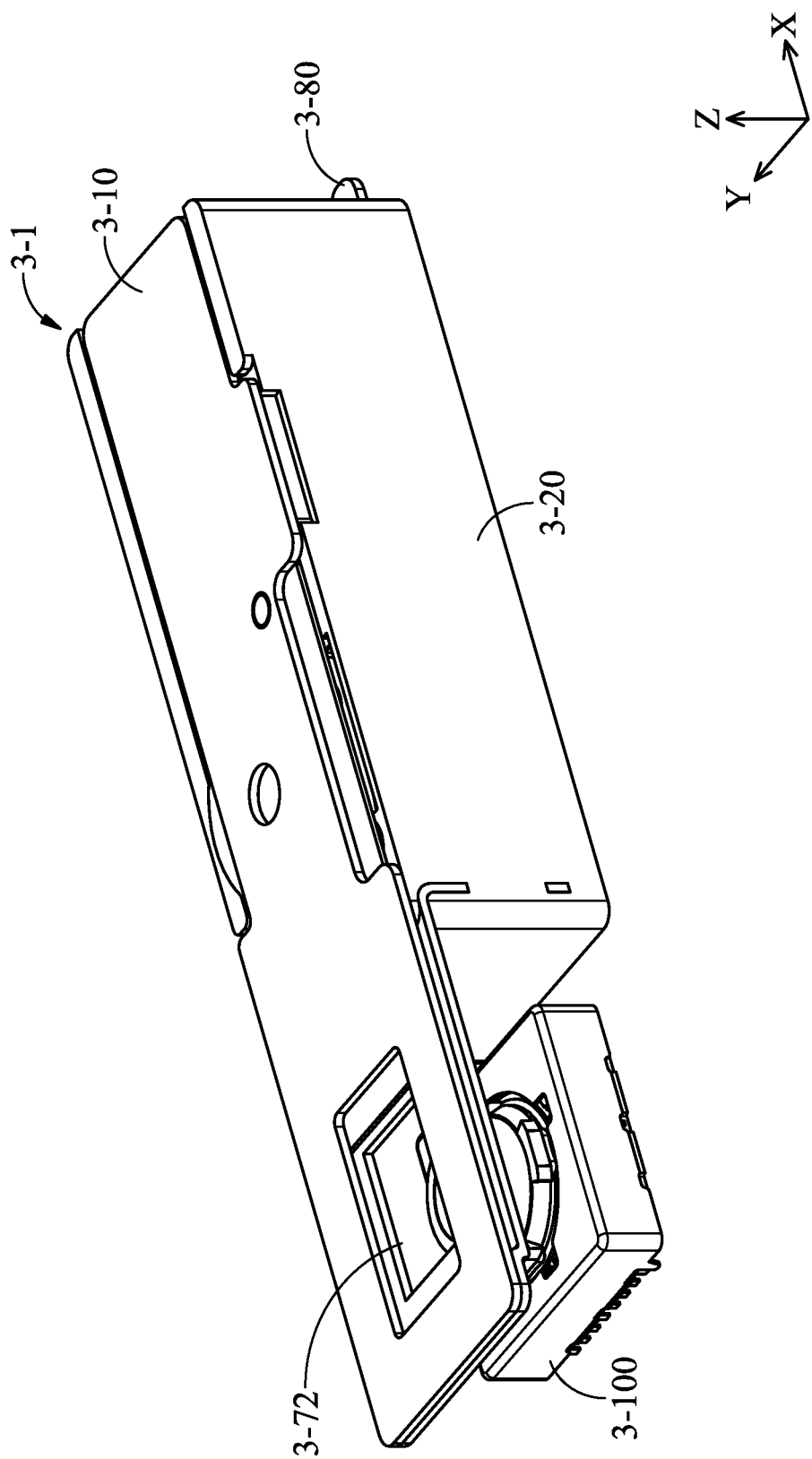
FIG. 1 is a schematic view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
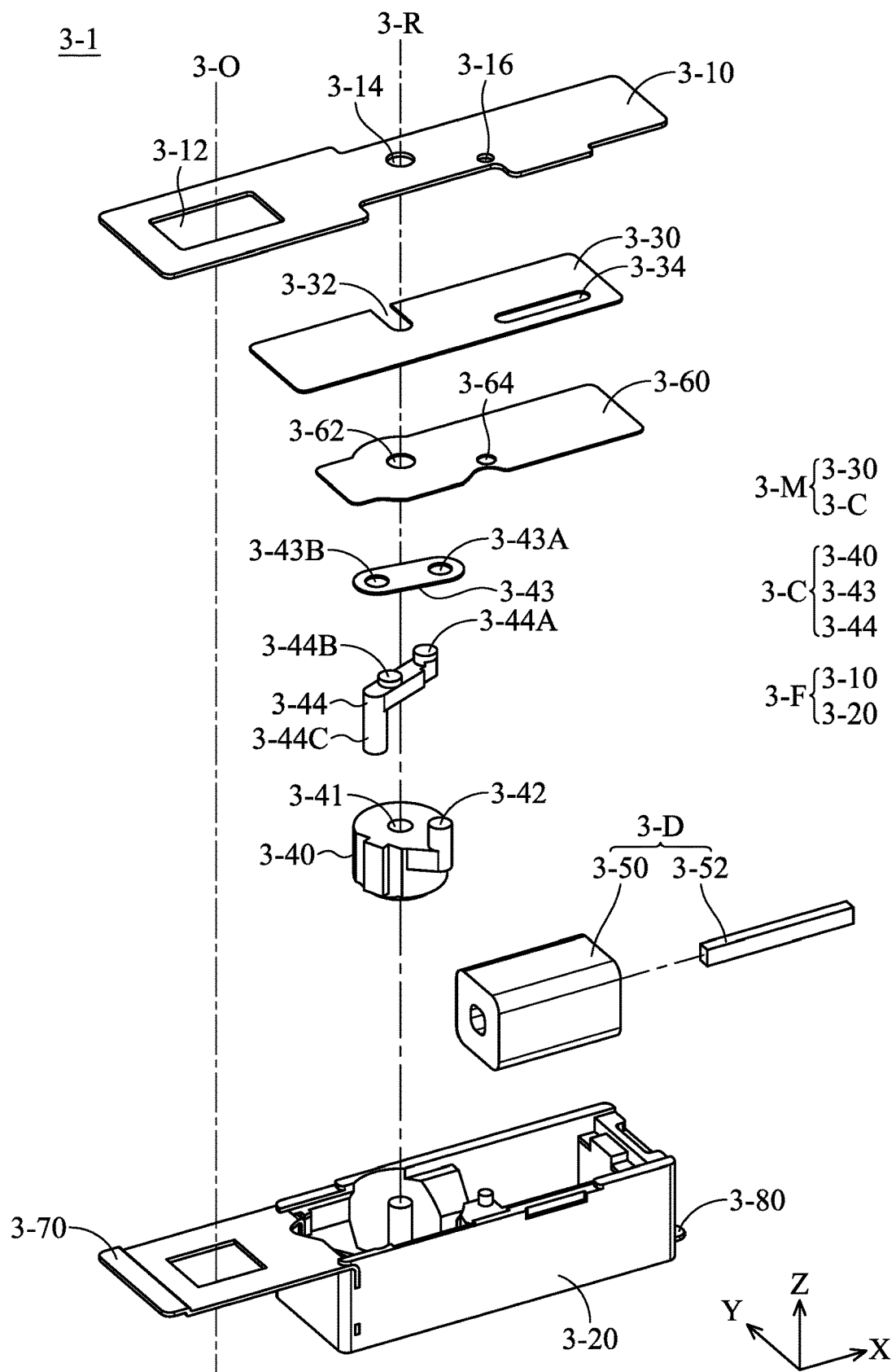
FIG. 2 is an exploded view of the optical element driving mechanism.
Figure 3:
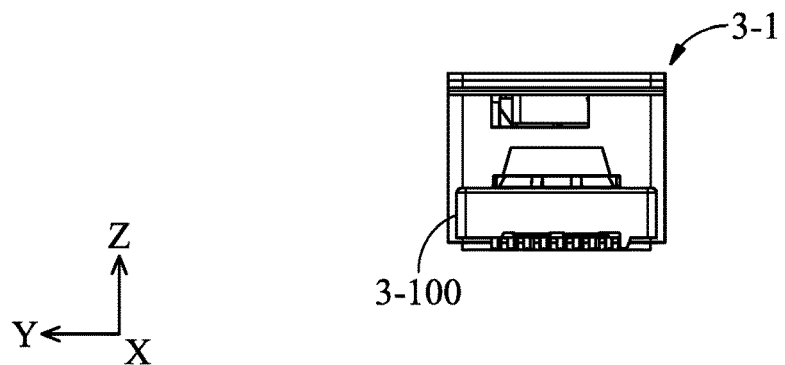
FIG. 3 is a side view of the optical element driving mechanism when viewed in a first direction.
Figure 4:
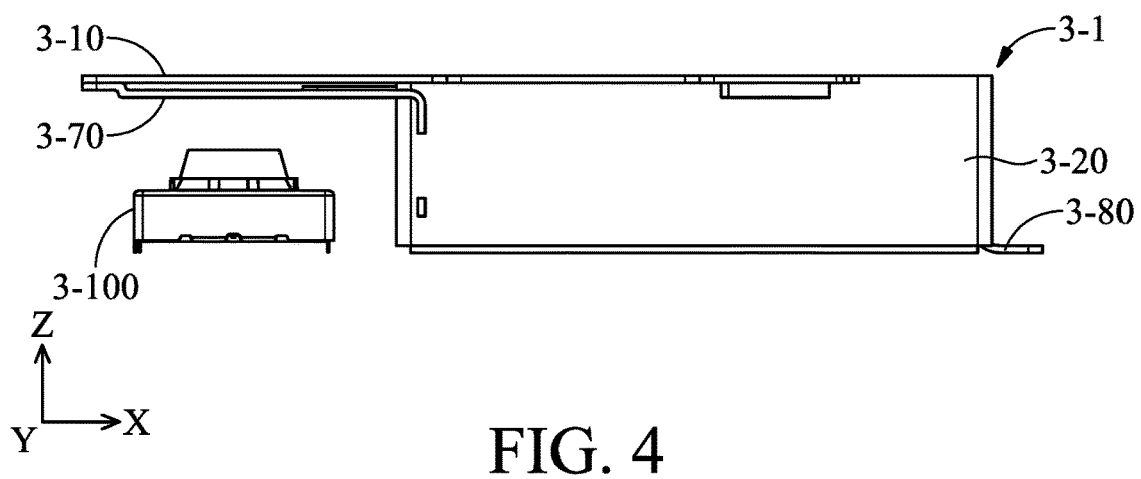
FIG. 4 is a side view of the optical element driving mechanism when viewed in a second direction.
Figure 5:
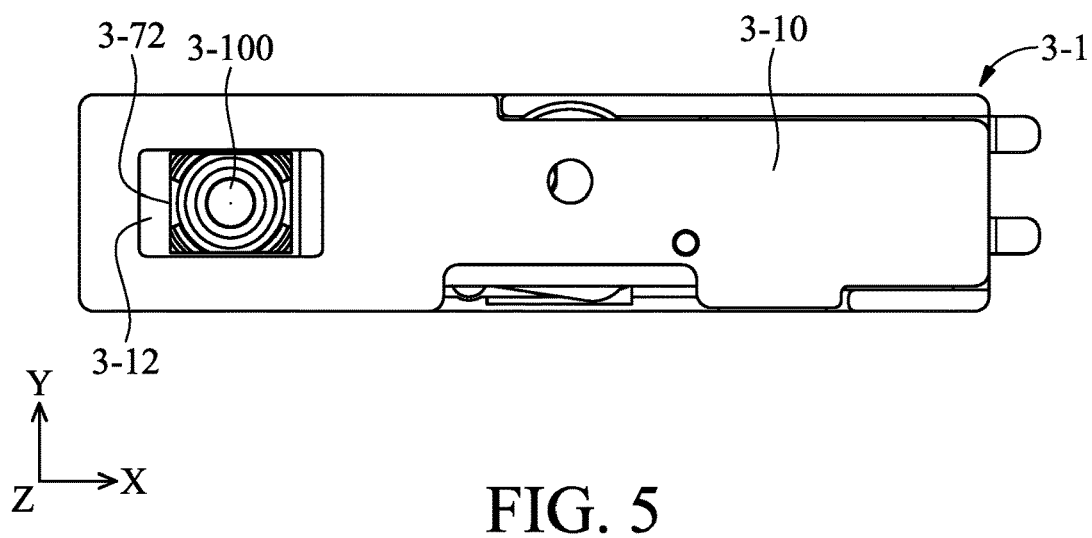
FIG. 5 is a top view of the optical element driving mechanism.

Refer to FIG. 1 to FIG. 5. FIG. 1 is a schematic view of an optical element driving mechanism 3-1 according to some embodiments of the present disclosure, FIG. 2 is an exploded view of the optical element driving mechanism 3-2, FIG. 3 is a side view of the optical element driving mechanism 3-1 when viewed in a first direction, FIG. 4 is a side view of the optical element driving mechanism 3-1 when viewed in a second direction, and FIG. 5 is a top view of the optical element driving mechanism 3-1. The optical element driving mechanism 3-1 mainly includes case 3-10, a base 3-20, an optical element 3-30, a rotation element 3-40, a first connecting element 3-43, a second connecting element 3-44, a magnetic element 3-50, a magnetic permeable element 3-52, and a blocking plate 3-60. An extending element 3-70 and a circuit 3-80 are disposed on the base 3-20.

The optical element driving mechanism 3-1 may be disposed with an optical module 3-100. The optical module 3-100 may be a voice coil motor (VCM) having an optical unit (such as a lens, a mirror, a prism, a beam splitter, or an aperture), or it may be the optical unit itself.

The case 3-10 may have an opening 3-12, a hole 3-14, and a hole 3-16. The main axis 3-O may pass through the opening 3-12, a rotational axis 3-R may pass through the hole 3-14, and the main axis 3-O and the rotational axis 3-R do not intersect. In some embodiments, the case 3-10 and the base 3-20 may be combined as an outer case of the optical element driving mechanism 3-1. Furthermore, the case 3-10 and the base 3-20 may be referred to as a fixed portion 3-F.

The optical element 3-30 may include a recess 3-32 and a passage 3-34, wherein the rotational axis 3-R may pass the passage 3-32. The rotation element 3-40 may be a magnet, and the rotation element 3-40 may have a hole 3-41 and a connecting portion 3-42. In some embodiments, the rotation element 3-40 may be a plastic magnet for facilitating manufacturing and achieving light weight. The first connecting element 3-43 may have a plate shape, and may include holes 3-43A and 3-43B. Protruding portions 3-44A, 3-44B and a connecting portion 3-44C may be positioned on the second connecting element 3-44. In some embodiments, the rotation element 3-40, the first connecting element 3-43 and the second connecting element 3-44 may be referred to as a connecting assembly 3-C for driving the optical element 3-30.

The optical element 3-30 may be moved in the X direction (the first direction) to act as a shutter of the optical module 3-100 or to block the optical module 3-100 when not using the optical module 3-100 (to be described later) to increase security. In some embodiments, the optical element 3-30 may be referred to as a movable portion 3-M and is movably disposed on the fixed portion 3-F.

The magnetic element 3-50 may be, for example, a driving coil, and the magnetic permeable element 3-52 may be disposed in the magnetic element 3-50. In other words, the magnetic element 3-50 and the magnetic permeable element 3-52 may act as an electromagnet. When current with different directions is pass to the magnetic element 3-50, the magnetic element 3-50 will interact with the magnetic field of the rotation element 3-40 to generate an electromagnetic force to rotate the rotation element 3-40 in different directions for controlling the position of the rotation element 3-40. Furthermore, the main axis 3-O does not pass through the magnetic permeable element 3-52. In some embodiments, glue may be provided at sides of the magnetic permeable element 3-52 that are facing or facing away the optical element 3-30, so the magnetic permeable element 3-52 may be attached on the magnetic element 3-50.

The blocking plate 3-60 may be disposed between the optical element 3-30 and the connecting assembly 3-C to limit the range of motion of the optical element 3-30 and the connecting assembly 3-C. Furthermore, holes 3-62 and 3-64 may be positioned on the blocking plate 3-60, and the rotational axis 3-R may pass through the hole 3-62.

Figure 6:
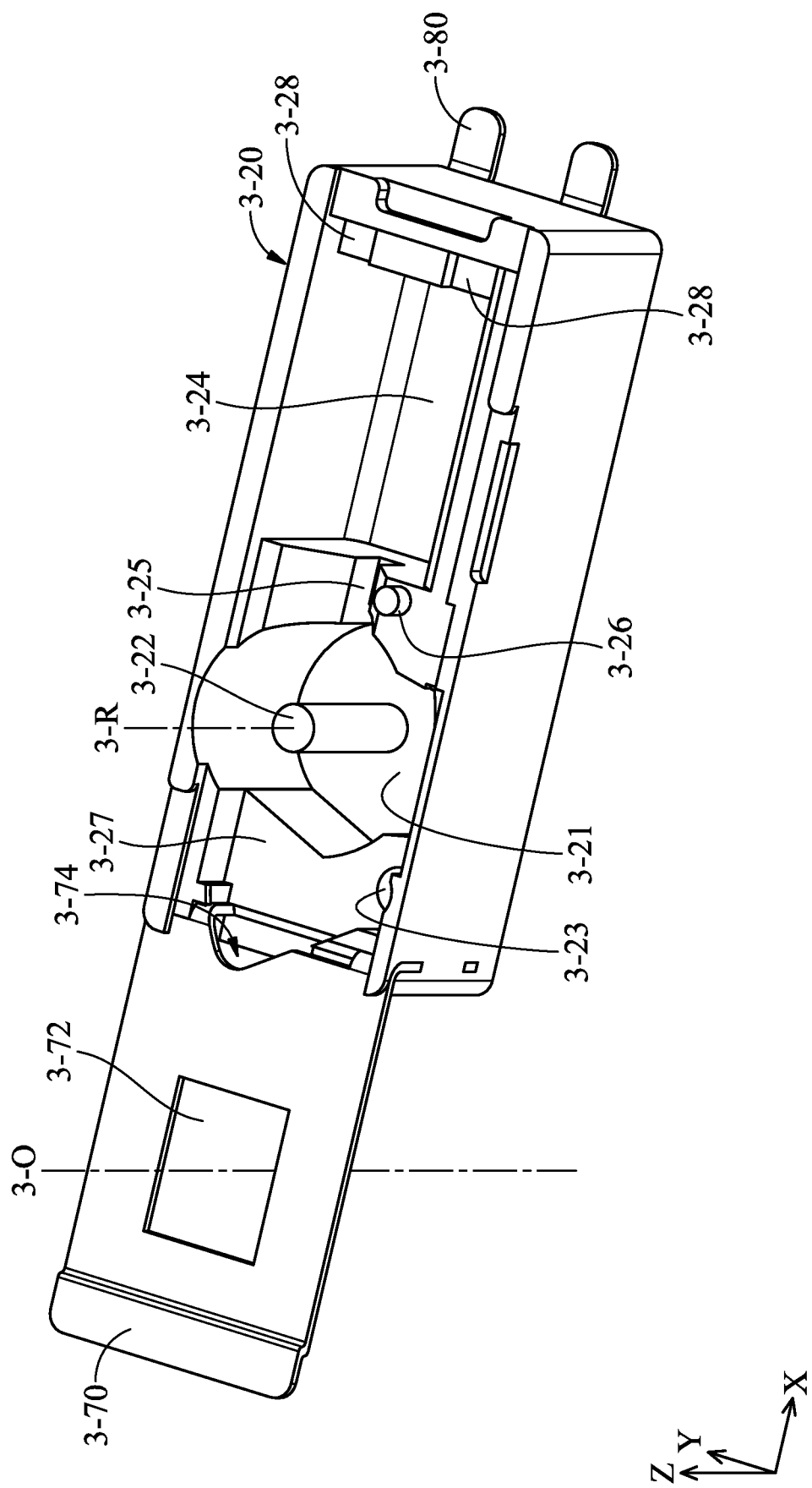
FIG. 6 to FIG. 8 are schematic views of the base viewed in different directions.
Figure 7:
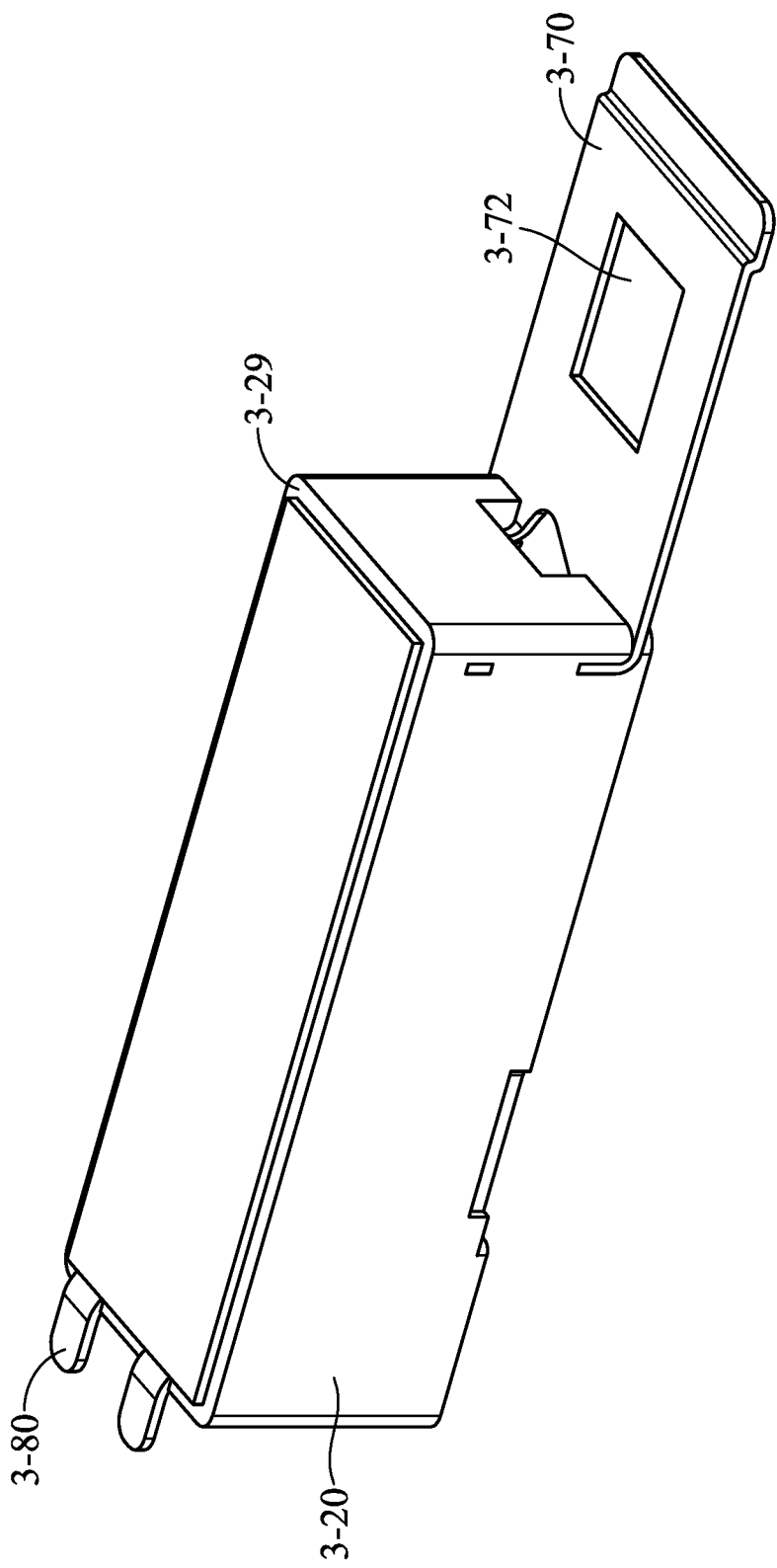
Figure 8:
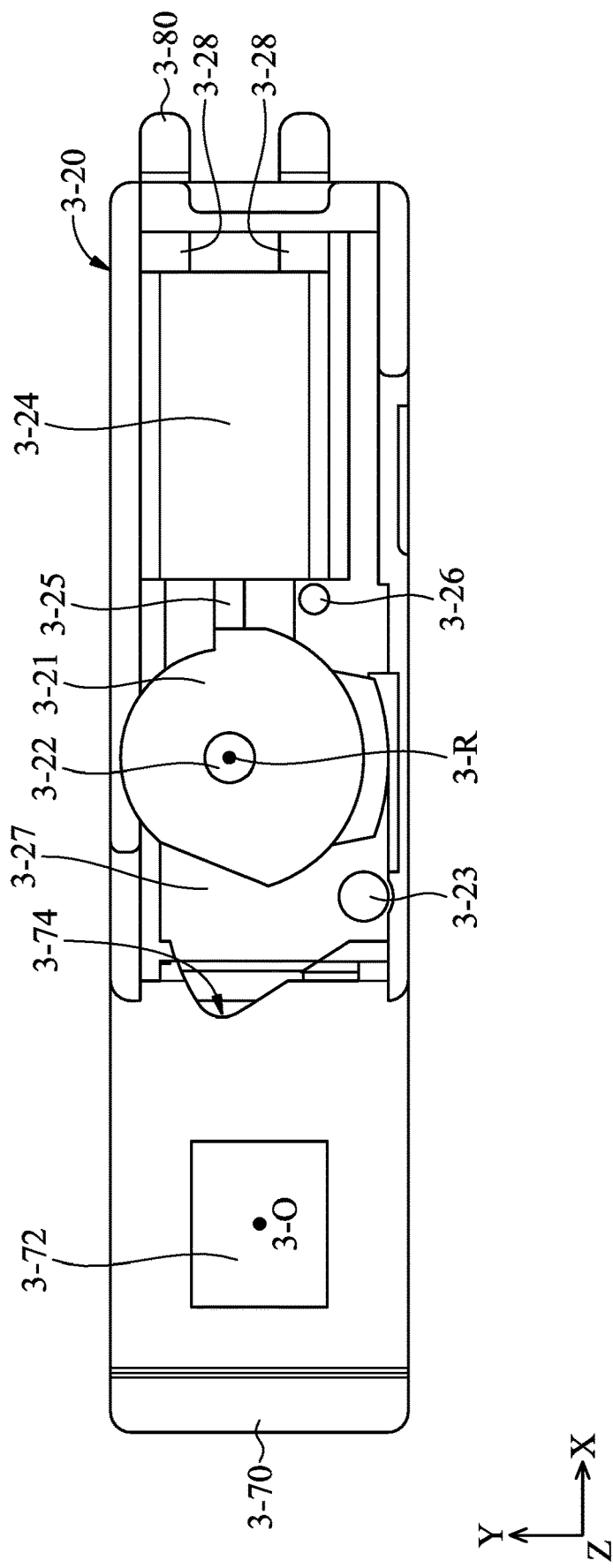

FIG. 6 to FIG. 8 are schematic views of the base 3-20 viewed in different directions. The base 3-20 may include a recess 3-21, a column 3-22 disposed in the recess 3-21, a recess 3-24, a recess 3-25, a limiting portion 3-26, a side portion 3-27, a hole 3-23 positioned on the side portion 3-27, a connecting portion 3-28, and a recess 3-29. Furthermore, the extending element 3-70 and the circuit 3-80 may be disposed on the base 3-20. For example, the extending element 3-70 and the circuit 3-80 may be at least partially embedded in the base 3-20. The extending element may have an opening 3-72, and the main axis 3-O may pass through the opening 3-72. The extending element 3-70 may further include a notch 3-74.

The column 3-22 may extend in the rotational axis 3-R and pass through the hole 3-62 of the block plate 3-60. Furthermore, in some embodiments, the circuit 3-80 may be further disposed on the connecting portion 3-28. In other words, the circuit 3-80 may be exposed from a side of the fixed portion 3-F that faces the optical element 3-30. The circuit 3-80 may be electrically connected to the driving assembly 3-D to provide electrical signal to the driving assembly 3-D. In some embodiments, and exit end of the circuit 3-80 and an exit of the wiring of the optical module 3-100 may be designed to be positioned at an identical side for facilitating manufacturing.

In some embodiments, the optical element driving mechanism 3-1 and the optical module 3-100 may be disposed on a substrate (not shown), and the elements may be affixed by glue. For example, the optical element driving mechanism 3-1 may be connected to the substrate by the base 3-20, and the recess 3-29 may accommodate excess glue.

Furthermore, as shown in FIG. 4, the extending element 3-70 is exposed from the case 3-10 rather than fully covered by the case 3-10 when viewed in the Y direction (the second direction). In some embodiments, as shown in FIG. 5, the optical module 3-100 is not fully exposed from the opening 3-72 of the extending element 3-70. In other words, the size of the opening 3-72 is less than the size of the driving assembly 3-D.

In some embodiments, a layer of light absorbing material may be provided on the extending element 3-70 to prevent reflected light influencing the optical module 3-100. For example, a layer of the light absorbing material may be provided on a side of the extending element 3-70 facing the optical module 3-100, or may be provided on the entire extending element 3-70, depending on design requirements. For example, the light absorbing material may be formed by plating, chemical plating, or spraying.

In some embodiments, when assembling the optical element driving mechanism 3-1, the driving assembly 3-D may be disposed in the base 3-20, and then the rotation element 3-40, the second magnetic element 3-44, the first magnetic element 3-43, the blocking plate 3-60, the optical element 3-30, the case 3-10 may be provided sequentially. In some embodiments, the block plate 3-60 may be omitted to achieve miniaturization.

Figure 9:
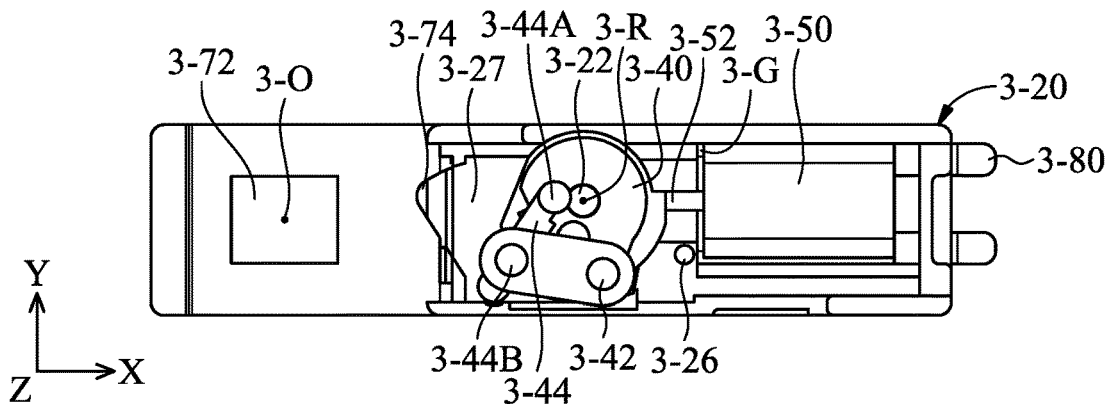
FIG. 9 is a top view of some elements of the optical element driving mechanism in an open condition.
Figure 10:
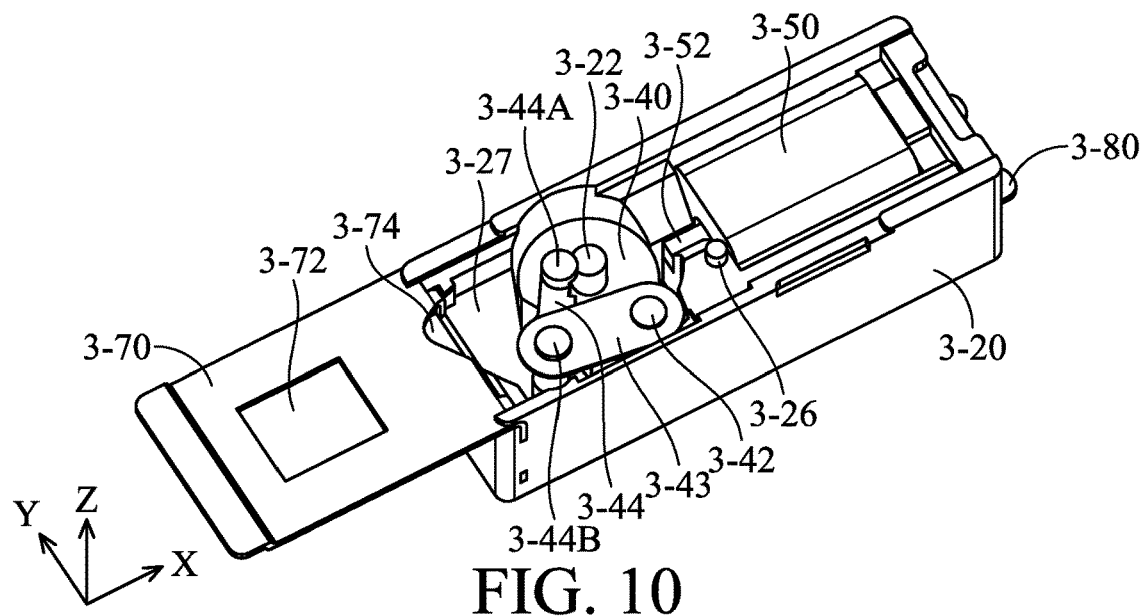
FIG. 10 is a schematic view of some elements of the optical element driving mechanism in the open condition.
Figure 11:
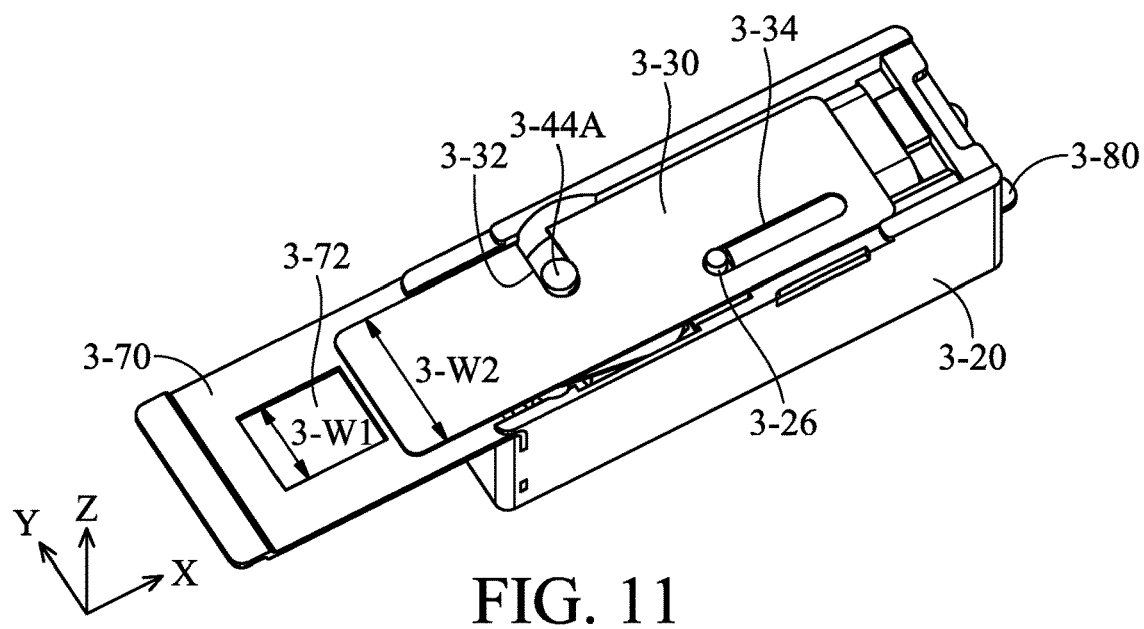
FIG. 11 is a schematic view of some elements of the optical element driving mechanism in the open condition.

FIG. 9 to FIG. 11 are a top view and side views of some elements of the optical element driving mechanism 3-1 in an open condition. As shown in FIG. 9 to FIG. 11, the limiting portion 3-26 of the base 3-20 may be positioned in the passage 3-34 of the optical element 3-30 for limit the range of motion of the optical element 3-30 (the movable portion 3-M) relative to the base 3-20 (the fixed portion 3-F). Furthermore, the limiting portion 3-26 may be disposed in the hole 3-16 of the case 3-10 and the hole 3-62 of the blocking plate 3-60 to define the positions of the case 3-10, the base 3-20, and the blocking plate 3-60.

The rotation element 3-40 may be disposed in the recess 3-21 of the base 3-21, and the column 3-22 may pass through the hole 3-41 of the rotation element 3-40. As a result, the connecting portion 3-42 of the rotation element 3-40 passes the hole 3-43A of the first connecting element 3-43, and the protruding 3-44B of the connecting element 3-44 passes the hole 3-43B of the first connecting element. In other words, the first connecting element 3-43 may be connected to the rotation element 3-40 and the second connecting element 3-44. As shown in FIG. 9, the rotational axis 3-R does not pass through the point where the rotation element 3-40 connects to the first connecting element 3-43 (i.e. the connecting portion 3-42), and the rotational axis 3-R does not pass through the second connecting element 3-44. Furthermore, the second connecting element 3-44 at least partially overlaps the rotation element 3-44 along the main axis 3-O.

As shown in FIG. 9, the magnetic element 3-50 is disposed in the recess 3-24 of the base 3-20, and the magnetic element 3-50 may be affixed on the base 3-20 by glue. In the X direction that is perpendicular to the main axis 3-O (i.e. the first direction), a gap 3-G is formed between the magnetic element 3-50 and the base 3-20 (the fixed portion 3-F), and the magnetic permeable element 3-52 extends in the X direction and may partially expose from the magnetic element 3-50. The portion of the magnetic permeable element 3-52 that is exposed from the magnetic element 3-50 may be disposed in the recess 3-25 of the base 3-20. As a result, the magnetic element 3-50 and the magnetic permeable element 3-52 may be prevented from in direct contact with the base 3-20 in the X direction to enhance their durability.

Figure 15:
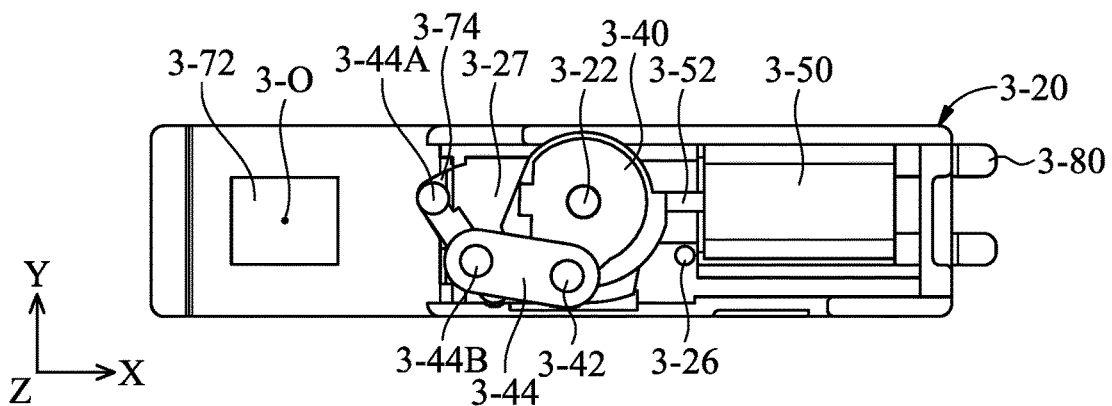
FIG. 15 is a top view of some elements of the optical element driving mechanism in a closed condition.
Figure 16:
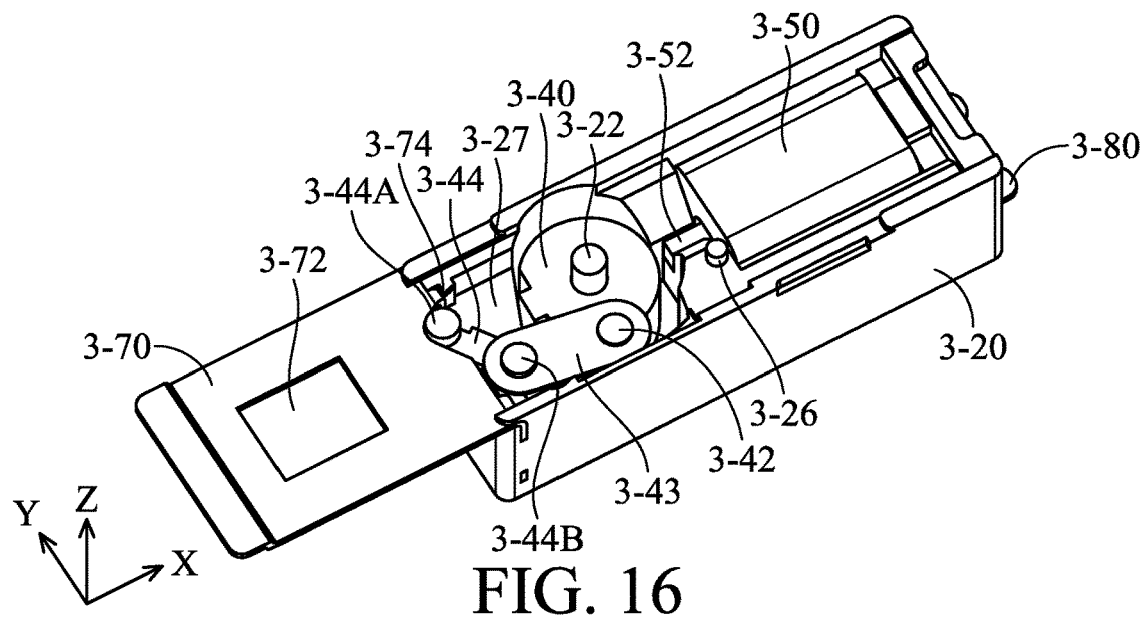
FIG. 16 is a schematic view of some elements of the optical element driving mechanism in the closed condition.
Figure 17:
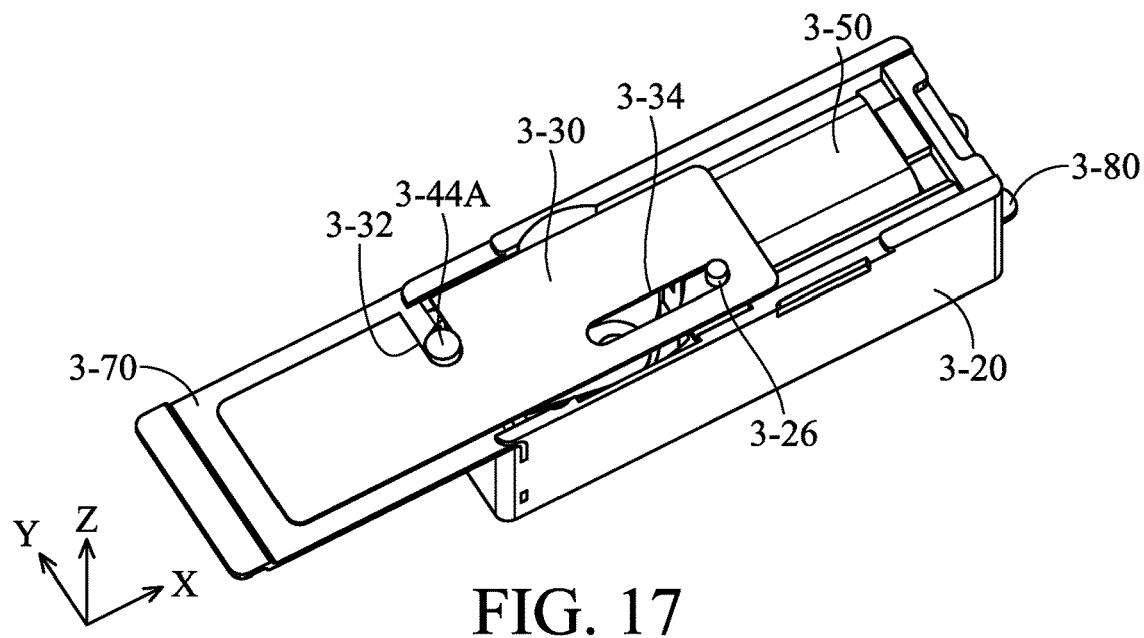
FIG. 17 is a schematic view of some elements of the optical element driving mechanism in the closed condition.

In some embodiments, as shown in FIG. 9, the size of the opening 3-72 if the extending element 3-70 is less than the size of the driving assembly 3-D. In some embodiments, as shown in FIG. 9, the size 3-W2 of the optical element 3-30 is greater than the size 3-W1 of the opening 3-72 of the extending element 3-70 in the Y direction (the second direction). As a result, the opening 3-72 of the extending element 3-70 may be fully blocked by the optical element 3-30 to prevent light from passing the opening 3-72 to reach the optical module 3-100 (FIG. 15 to FIG. 17).

Moreover, the size of the opening 3-12 may be greater than the size of the opening 3-72 (such as the size in the X direction or in the Y direction) to reduce the size of the opening that is closer to the optical module 3-100, and the optical route of the light entering the optical module 3-100 may be adjusted.

As shown in FIG. 3 and FIG. 9, the optical module 3-100 has a rectangular shape and is arranged with the driving assembly 3-D in the X direction that is perpendicular to the optical axis 3-O (the first direction), and the optical module 3-100 at least partially overlaps the fixed portion 3-F. As a result, the required space may be reduced to achieve miniaturization.

Figure 12:
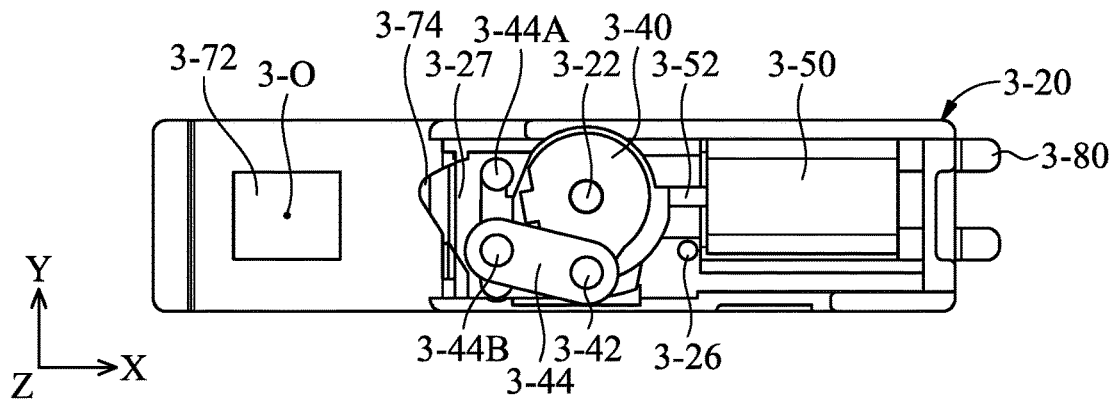
FIG. 12 is a top view of some elements of the optical element driving mechanism in a transitional condition.
Figure 13:
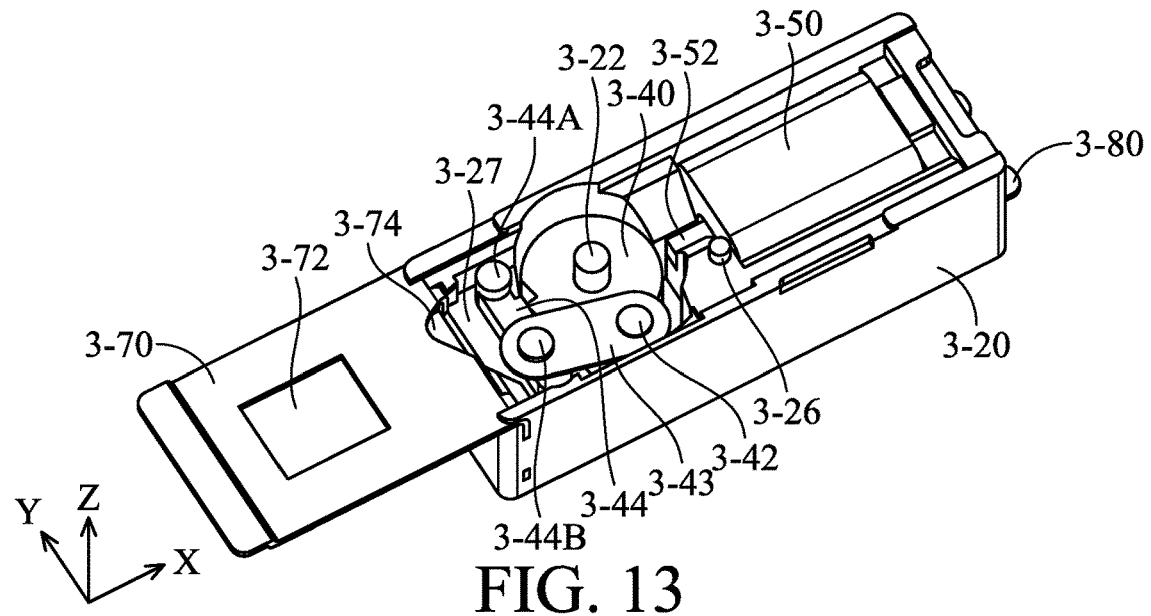
FIG. 13 is a schematic view of some elements of the optical element driving mechanism in the transitional condition.
Figure 14:
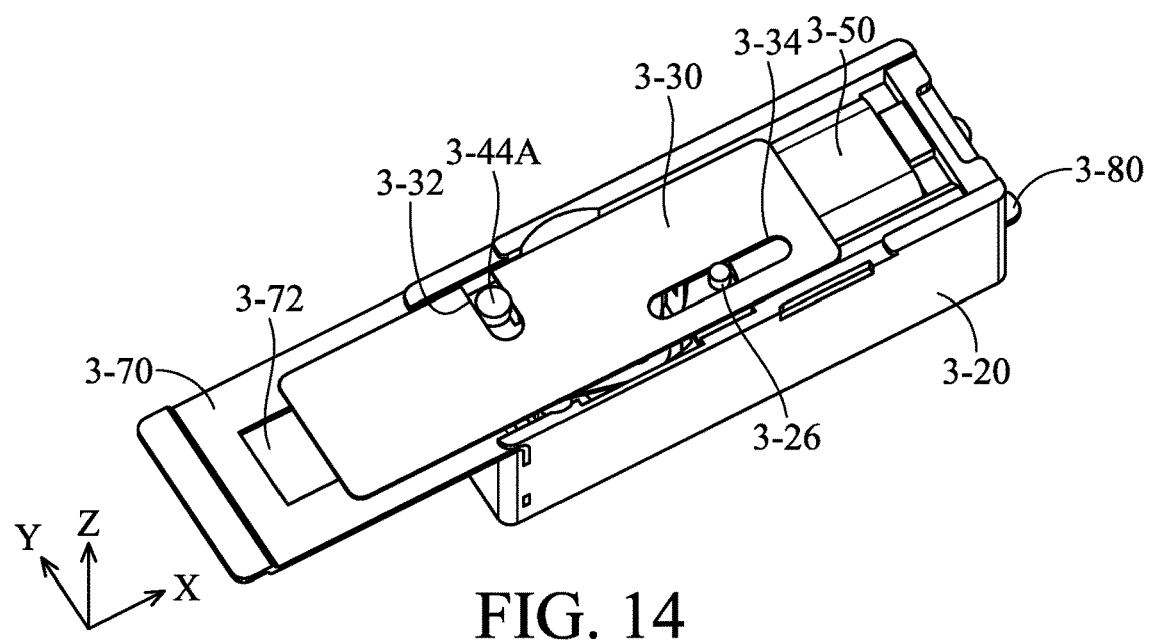
FIG. 14 is a schematic view of some elements of the optical element driving mechanism in the transitional condition.

FIG. 12 to FIG. 14 are a top view and side views of some elements of the optical element driving mechanism 3-1 in a transitional condition. An electromagnetic force is applied to the rotation element 3-40 by the driving assembly 3-D to rotate the rotation element 3-40. It should be noted that the connecting portion 3-42 of the rotation element 3-40 is disposed in the hole 3-43A of the first connecting element 3-43, so the first connecting element 3-43 may be moved with the rotation of the rotation element 3-40. Furthermore, the protruding portion 3-44B of the second connecting element 3-44 is disposed in the hole 3-43B of the first connecting element, and the connecting portion 3-44C is disposed in the hole 3-23 of the base 3-20 and is rotatable in the hole 3-23, so the second connecting element 3-44 may rotate using the connecting portion 3-44C as a rotational axis with the rotation of the rotation element 3-40. It should be noted that the second connecting element 3-44 does not in direct contact with the side portion 3-27 of the base 3-20. In other words, the second connecting element 3-44 has a distance that is greater than zero to the base 3-20 in the Z direction.

As shown in FIG. 14, the protruding portion 3-44A of the second connecting element 3-44 is disposed in the recess 3-32 of the optical element 3-30, so the optical element 3-30 may be moved in the X direction with the second connecting element 3-44 when the second connecting element 3-44 is rotating using the connecting portion 3-44C as a rotational axis. In other words, the mode of motion of the optical element 3-30 (i.e. translational movement) is different than the mode of motion of the connecting assembly 3-C (i.e. rotational movement). It should be noted that the opening 3-72 of the extending element 3-70 is partially covered by the optical element 3-30.

FIG. 15 to FIG. 17 are a top view and side views of some elements of the optical element driving mechanism 3-1 in a closed condition. An electromagnetic force may be further applied to the rotation element 3-40 by the driving assembly 3-D until the protruding portion 3-44A is in contact with the notch 3-74 of the extending element 3-70, or until the passage 3-34 of the optical element 3-30 is in contact with the limiting portion 3-26 of the base 3-20 to stop the movement of the optical element 3-30 and the connecting assembly 3-C.

It should be noted that the opening 3-72 of the extending element 3-70 and the optical module 3-100 (not shown) are covered by the optical element 3-30, so light may be prevented from entering the optical module 3-100. As a result, the optical element 3-30 may act as a shutter of the optical module 3-100, which means only covering the optical module 3-100 of a specific period. In some embodiments, the optical module 3-100 may be continuously covered by the optical element 3-30 to increase the security when the optical module 3-100 is not in use.

Figure 18:
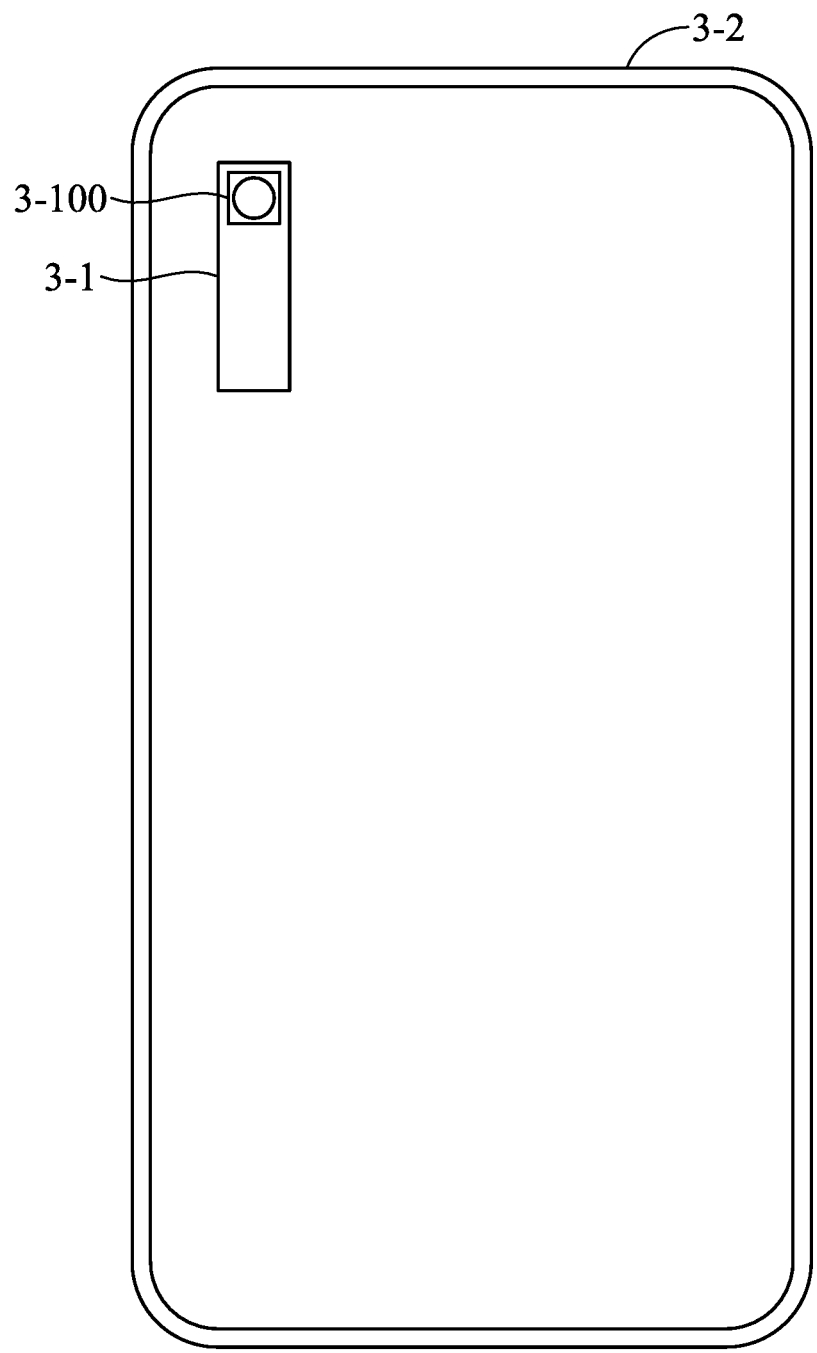
FIG. 18 and FIG. 19 are schematic views when the optical element driving mechanism is disposed in electronic elements.
Figure 19:
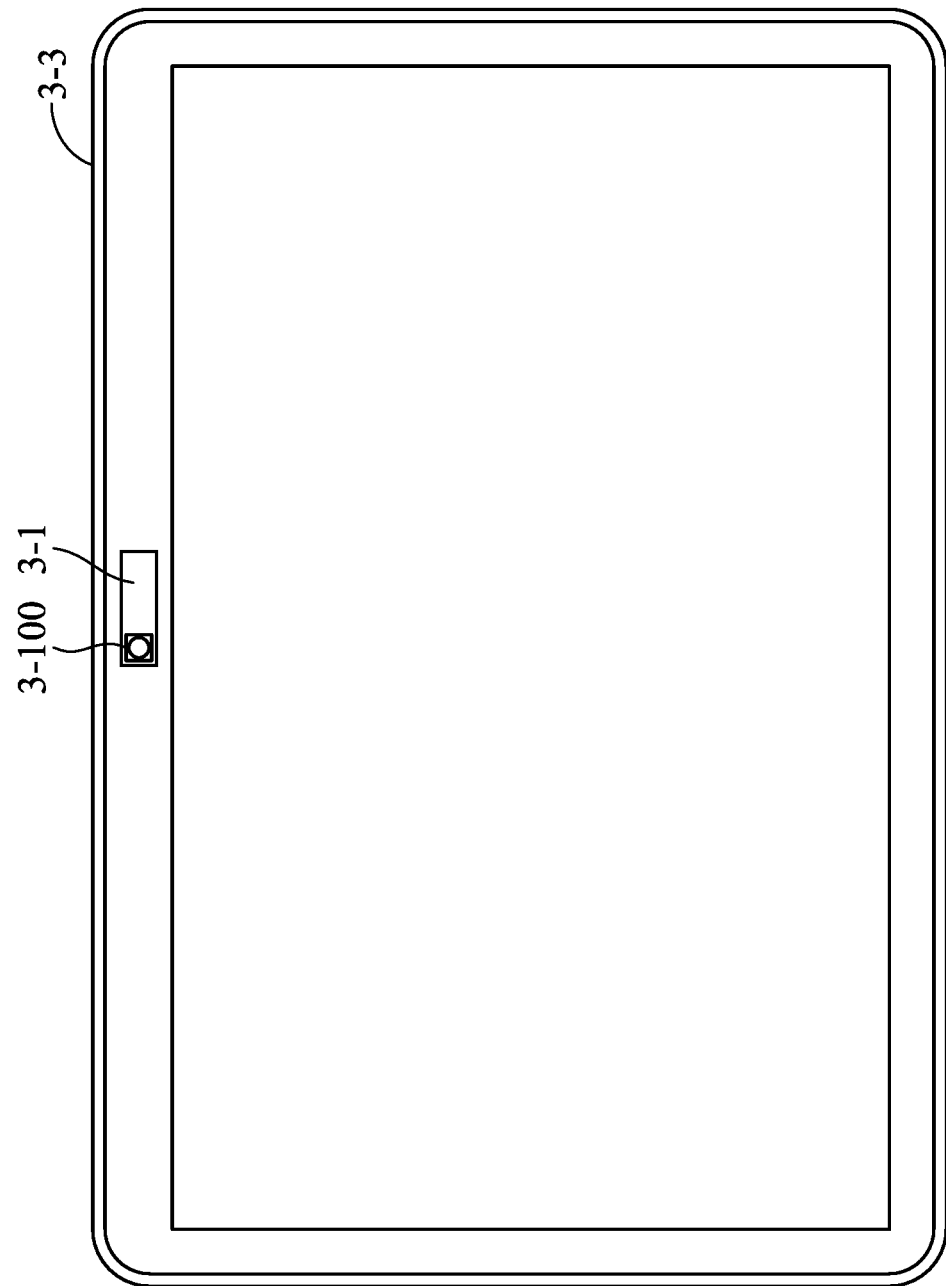

FIG. 18 and FIG. 19 are schematic views when the optical element driving mechanism 3-1 is disposed in electronic elements 3-2 and 3-3. The way that how the optical element driving mechanism 3-1 is positioned in the electronic devices may be changed based on the direction of the display of the electronic devices. For example, the electronic element 3-2 may be a cellphone, the electronic element 3-3 may be a computer display, and the long side of the optical element driving mechanism 3-1 may position at an identical side of the long side of the electronic elements 3-2 or 3-3 to enhance performance.

In summary, an optical element driving mechanism is provided. The optical element driving mechanism includes a fixed portion, a movable portion, and a driving assembly. The fixed portion includes a limiting portion. The movable portion is movably disposed on the fixed portion and includes an optical element and a connecting assembly. The optical element has a main axis. The connecting assembly is connected to the optical element. The driving assembly is at least partially disposed on the fixed portion, wherein the limiting portion is used for limiting the range of motion of the movable portion relative to the fixed portion. As a result, the optical module may be prevented from being exposed from the opening to increase the security of the optical module when the optical module is not in use, or the optical element driving mechanism may act as a shutter of the optical module.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
   a fixed portion comprising a limiting portion;
   a movable portion movably disposed on the fixed portion and comprising:
      an optical element having a main axis; and
      a connecting assembly connected to the optical element; and
   a driving assembly at least partially disposed on the fixed portion, wherein the limiting portion is used for limiting a range of motion of the movable portion relative to the fixed portion,
   wherein the driving assembly comprises:
      a magnetic element; and
      a magnetic permeable element disposed in the magnetic element, wherein the main axis does not pass through the magnetic permeable element.

2. The optical element driving mechanism as claimed in claim 1, wherein the connecting assembly further comprises:
   a rotation element rotating around a rotational axis;
   a first connecting element; and
   a second connecting element, wherein the rotation element and the second connecting element are connected to the first connecting element.

3. The optical element driving mechanism as claimed in claim 2, wherein the rotational axis does not pass through where the rotation element is connected to the first connecting element.

4. The optical element driving mechanism as claimed in claim 2, wherein the second connecting element at least partially overlaps the rotation element along the main axis during an open condition.

5. The optical element driving mechanism as claimed in claim 4, wherein the rotational axis does not pass through the second connecting element during the open condition.

6. The optical element driving mechanism as claimed in claim 2, wherein the main axis and the rotational axis do not intersect.

7. The optical element driving mechanism as claimed in claim 1, further comprising a circuit at least partially embedded in the fixed portion.

8. The optical element driving mechanism as claimed in claim 7, wherein the circuit is exposed from a side of the fixed portion that faces the optical element.

9. The optical element driving mechanism as claimed in claim 1, wherein a gap is formed between the magnetic element and the fixed portion in a first direction that is perpendicular to the main axis.

10. The optical element driving mechanism as claimed in claim 9, wherein the magnetic permeable element extends in the first direction.

11. The optical element driving mechanism as claimed in claim 1, wherein the fixed portion comprises:
  a base;
  a case disposed on the base; and
  an extending element disposed on the base, wherein the extending element has an opening, and the main axis passes through the opening.

12. The optical element driving mechanism as claimed in claim 11, wherein the extending element is exposed from the case when viewed in a second direction that is perpendicular to the main axis.

13. The optical element driving mechanism as claimed in claim 11, wherein the base has a recess on a side facing away from the case.

14. The optical element driving mechanism as claimed in claim 11, wherein the size of the opening is less than the size of the driving assembly.

15. The optical element driving mechanism as claimed in claim 11, wherein the size of the optical element is greater than the size of the opening in a second direction that is perpendicular to the main axis.

16. The optical element driving mechanism as claimed in claim 1, wherein a mode of motion of the optical element is different than a mode of motion of the connecting assembly.

17. The optical element driving mechanism as claimed in claim 1, further comprising an optical module, wherein the optical module and the driving assembly are arranged in a first direction that is perpendicular to the main axis.

18. The optical element driving mechanism as claimed in claim 17, wherein the optical module has a rectangular shape.

19. The optical element driving mechanism as claimed in claim 17, wherein the optical module and the fixed portion at least partially overlap each other in the first direction.

20. An optical element driving mechanism, comprising:
  a fixed portion comprising a limiting portion;
  a movable portion movably disposed on the fixed portion and comprising:
    an optical element having a main axis; and
    a connecting assembly connected to the optical element;
  a driving assembly at least partially disposed on the fixed portion, wherein the limiting portion is used for limiting a range of motion of the movable portion relative to the fixed portion; and
  a circuit at least partially embedded in the fixed portion.

* * * * *